UNITED STATES PATENT OFFICE

PEDRO M. RIVERO, OF NEW YORK, N. Y.

IMPROVEMENT IN PROCESSES FOR TREATING TOBACCO.

Specification forming part of Letters Patent No. 155,388, dated September 29, 1874; application filed September 11, 1873.

*To all whom it may concern:*

Be it known that I, PEDRO M. RIVERO, of the city, county, and State of New York, have invented an Improved Process of Preparing Tobacco-Stems in the Manufacture of Fillers for Cigars, Cigarettes, or for Smoking-Tobacco, of which the following is a specification:

The invention consists in drying the tobacco-stems as they are stripped from the leaves, and, without any previous treatment or preparation, pressing them when dry, subsequently sprinkling them with water, and finally drying them again.

The stems, being stripped from the rest of the leaf, and without any previous treatment or preparation, are thoroughly dried, then passed between rollers or placed in a press, and flattened out as thin as possible. This has made them compact, and consequently of little combustibility. They are then slightly moistened with a fine irrigator or a current of steam only sufficient to cause the stems, which eagerly absorb the moisture, to swell somewhat. This moistening gives them the essential porosity. After being moistened, they are allowed to dry, and, in drying, they remain soft and porous. They are then cut up, crushed, or prepared in any necessary manner to form fillers to be inclosed in a wrapper in the manufacture of cigars, cigarettes, or smoking-tobacco.

By this process none of the chemical elements entering into the composition of the stems are lost or modified. The natural juices, aroma, and properties of the leaf are retained, but the combustibility of the stems is increased, and they burn very easily, since, through the different stages of the process, they become soft, light, and spongy, and retain all their natural elements, thus combining the essential qualities of all good cigars.

Having thus described my invention, what I claim as new, and desire to secure by Letters Patent, is—

The process herein described for treating tobacco-stems in the manufacture of cigar or cigarette fillers, or smoking-tobacco, consisting in drying the stems as they are taken from the leaf, and, without any previous treatment, pressing them while dry, sprinkling with water, and then redrying, substantially as and for the purposes set forth and described.

PEDRO M. RIVERO.

Witnesses:
ANTONIO C. GONZALES,
J. M. D. VILLEGAS.